(12) United States Patent
Kim et al.

(10) Patent No.: US 10,079,617 B2
(45) Date of Patent: Sep. 18, 2018

(54) D2D COMMUNICATION METHOD AND APPARATUS BASED ON CHANNEL HOPPING

(71) Applicant: LG ELECTRONICS INC., Seoul (KR)

(72) Inventors: Suhwook Kim, Seoul (KR); Jinyoung Chun, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 177 days.

(21) Appl. No.: 15/034,273

(22) PCT Filed: Oct. 21, 2014

(86) PCT No.: PCT/KR2014/009890
§ 371 (c)(1),
(2) Date: May 4, 2016

(87) PCT Pub. No.: WO2015/068967
PCT Pub. Date: May 14, 2015

(65) Prior Publication Data
US 2016/0294439 A1 Oct. 6, 2016

Related U.S. Application Data

(60) Provisional application No. 61/900,336, filed on Nov. 5, 2013, provisional application No. 61/900,415, filed on Nov. 6, 2013.

(51) Int. Cl.
*H04B 1/713* (2011.01)
*H04W 4/00* (2018.01)
(Continued)

(52) U.S. Cl.
CPC ............ *H04B 1/713* (2013.01); *H04W 4/008* (2013.01); *H04W 4/80* (2018.02); *H04W 48/16* (2013.01);
(Continued)

(58) Field of Classification Search
CPC ...... H04B 1/713; H04W 4/008; H04W 48/16; H04W 76/023; H04W 88/06
See application file for complete search history.

(56) References Cited

U.S. PATENT DOCUMENTS

2003/0186683 A1   10/2003   Yamato
2008/0031184 A1   2/2008    Seo
(Continued)

FOREIGN PATENT DOCUMENTS

JP    2003-32149 A    1/2003
JP    2005-286729 A   10/2005
(Continued)

*Primary Examiner* — Luat Phung
(74) *Attorney, Agent, or Firm* — Birch, Stewart, Kolasch & Birch, LLP

(57) ABSTRACT

A device to device (D2D) communication method on the basis of channel hopping may comprise the steps of: a first terminal determining a delay requirement for first link-based D2D communication with a second terminal; the first terminal determining a hopping sequence for first link-based first D2D communication on the basis of the delay requirement; and the first terminal performing first D2D communication with the second terminal on the basis of the hopping sequence, wherein the delay requirement may be a minimum time interval during which data transmission or reception for the first D2D communication is made between a PHY layer and an MAC layer of the first terminal and a PHY layer or an MAC layer of the second terminal.

12 Claims, 12 Drawing Sheets

(51) Int. Cl.
*H04W 48/16* (2009.01)
*H04W 76/02* (2009.01)
*H04W 76/14* (2018.01)
*H04W 4/80* (2018.01)
*H04W 88/06* (2009.01)

(52) U.S. Cl.
CPC ......... *H04W 76/023* (2013.01); *H04W 76/14* (2018.02); *H04W 88/06* (2013.01)

(56) References Cited

U.S. PATENT DOCUMENTS

| | | | |
|---|---|---|---|
| 2009/0011770 A1 | 1/2009 | Jung et al. | |
| 2009/0257351 A1* | 10/2009 | Hande | H04W 28/02 370/236 |
| 2010/0110929 A1 | 5/2010 | Li et al. | |
| 2011/0294474 A1* | 12/2011 | Barany | H04W 8/005 455/414.1 |
| 2014/0126417 A1 | 5/2014 | Kang et al. | |
| 2014/0160950 A1* | 6/2014 | Vasudevan | H04W 76/043 370/252 |

FOREIGN PATENT DOCUMENTS

| | | |
|---|---|---|
| JP | 2009-284242 A | 12/2009 |
| KR | 10-2008-0013119 A | 2/2008 |
| WO | WO 2013/012222 A2 | 1/2013 |

* cited by examiner

D2D COMMUNICATION METHOD AND APPARATUS BASED ON CHANNEL HOPPING

CROSS REFERENCE TO RELATED APPLICATIONS

This application is the National Phase of PCT/KR2014/009890 filed on Oct. 21, 2014, which claims priority under 35 U.S.C. § 119(e) to U.S. Provisional Application Nos. 61/900,336 filed on Nov. 5, 2013, and 61/900,415 filed on Nov. 6, 2013, all of which are hereby expressly incorporated by reference into the present application.

BACKGROUND OF THE INVENTION

Field of the Invention

The present invention relates to wireless communications, and more particularly to a device-to-device (D2D) communication method and apparatus based on channel hopping.

Related Art

In most traditional communication environments, users access a server through user devices to download or upload desired content. Such a server-based communication environment is referred to as an infrastructure communication environment. In the infrastructure communication environment, users generally access a server through a base station (BS) of cellular communication or an access point (AP) of a wireless local area network (WLAN).

Recently, device-to-device (D2D) communication receives growing attention. A large number of smartphone applications support D2D communication-based services. D2D communication supports direct communication between user devices. So far, D2D communication has been supported mostly in an application layer. When D2D communication is supported only in the application layer, a server still serves as a relay to connect user devices and user devices may operate in a physical (PHY) layer and a medium access control (MAC) layer in the same way as in the infrastructure communication environment.

When D2D communication is supported also in a PHY layer and MAC layer of a user device, data transmission and/or reception may be performed directly between user devices via no server in D2D communication, unlike in the infrastructure communication environment. That is, data for D2D communication may be transmitted directly between user devices via no server, thereby efficiently using communication resources.

When D2D communication is supported also in a PHY layer and MAC layer of a user device, a transmission delay is reduced and transmission is performed within a relatively close range, and thus transmission power may be also saved. In addition, since no connection is necessary between a user device and a server, a user may transmit massive data to another user device without charge.

In the D2D communication environment, communication between user devices is performed via no BS or AP, and thus it is necessary to design a PHY layer and MAC layer for D2D communication in view of resource allocation, interference avoidance, and synchronization.

SUMMARY OF THE INVENTION

An aspect of the present invention is to provide a device-to-device (D2D) communication method based on channel hopping.

Another aspect of the present invention is to provide a D2D communication apparatus based on channel hopping To achieve the aforementioned aspects, a D2D communication method based on channel hopping according to one embodiment of the present invention may include determining, by a first device, a delay requirement for first link-based D2D communication with a second device; determining, by the first device, a hopping sequence for the first link-based D2D communication on the basis of the delay requirement; and performing, by the first device, the first link-based D2D communication with the second device on the basis of the hopping sequence, wherein the delay requirement may be a minimum time interval during which data transmission or reception for the first D2D communication is performed between a physical (PHY) layer or a medium access control (MAC) layer of the first device and a PHY layer or an MAC layer of the second device.

To achieve the aforementioned aspects, first device performing D2D communication method based on channel hopping according to another embodiment of the present invention may include a radio frequency (RF) unit configured to transmit or receive a radio signal; and a processor operatively connected to the RF unit, wherein the processor may be configured to determine a delay requirement for first link-based D2D communication with a second device, to determine a hopping sequence for the first link-based D2D communication on the basis of the delay requirement, and to perform the first link-based D2D communication with the second device on the basis of the hopping sequence, and the delay requirement may be a minimum time interval during which data transmission or reception for the first D2D communication is performed between a PHY layer or an MAC layer of the first device and a PHY layer or an MAC layer of the second device.

A device may operate by setting a hopping sequence according to a delay requirement in D2D communication, thereby effectively utilizing D2D communication resources and reducing power consumption of the device.

DESCRIPTION OF EXEMPLARY EMBODIMENTS

A device-to-device (D2D) communication environment, unlike an infrastructure communication environment, may have characteristics as follows.

A D2D device (hereinafter, referred to as a device) may have high mobility. While a base station (BS) or access point (AP) is stationary in the infrastructure communication environment, both a transmission device and a reception device have mobility in D2D communication, thus leading to relatively greater mobility.

A device may have multiple sessions. Conventionally, a device receives all content through a BS/AP. In D2D communication, however, one device may simultaneously maintain a plurality of sessions (or links) with a plurality of different devices. For example, one device may chat with another device, transmitting/receiving different pieces of data to/from a third device, through a plurality of sessions.

Devices may have different synchronizations. Conventionally, network synchronization between a plurality of devices is performed based on a BS/AP. In D2D communication where communications are performed without a BS or AP, however, synchronization based on a BS and AP is impossible.

In the present invention, it is assumed that D2D communication is performed based on an IEEE 802.11 carrier sense multiple access (CSMA)-collision avoid (CA) system. It is a crucial issue for a device to determine which channel is allocated to each session when maintaining multiple sessions with a plurality of other devices.

Figure 1:
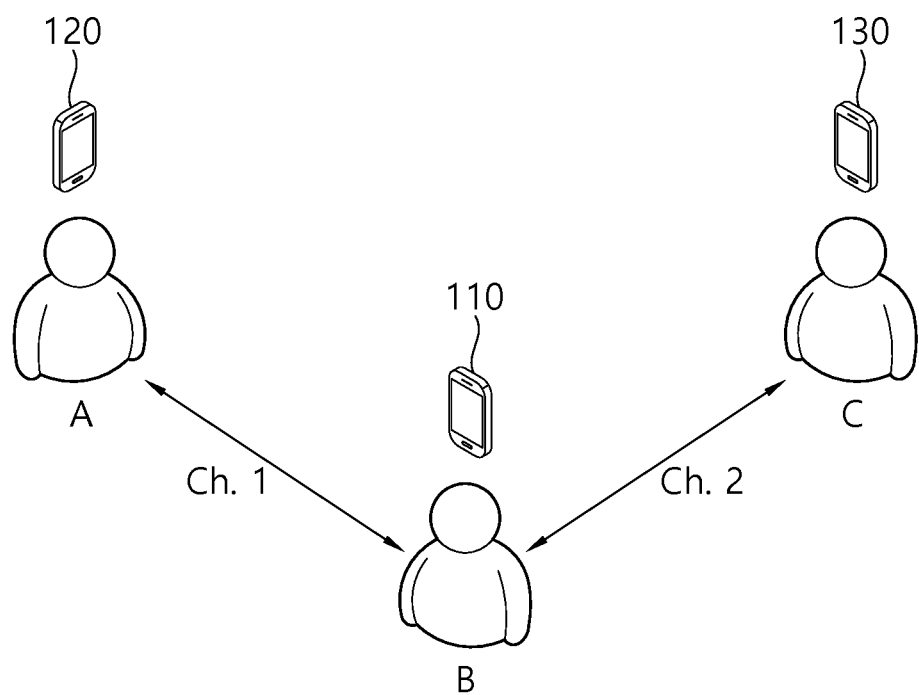
FIG. 1 is a conceptual view illustrating a device-to-device (D2D) communication.

FIG. 1 is a conceptual view illustrating D2D communication.

FIG. 1 illustrates resource allocation in a case where device A 110 performs D2D communications with device B 120 and device C 130 through respective sessions.

It is assumed that device A 110 communicates with device B 120 based on channel 1 and device A 110 communicates with device C 130 based on channel 2.

When D2D communication is performed based on a CSMA-CA system, a device may monitor (or sense) only one channel at a particular time. That is, two channels may not be monitored simultaneously. A time resource for communication between device A 110 and device B 120 through channel 1 is not allowed to overlap a time resource for communication between device A 110 and device C 130 through channel 2.

Device A 110 may communicate with device B 120 and device C 130 by two communication methods. In a first communication method, communications may be performed by setting the same channel for two sessions. For example, when an operation channel for device C 130 is changed to channel 1 based on a request from device A 110, device A 110 may communicate with device B 120 and device C 130 by monitoring channel 1 only. This method may be effective for an environment including a small number of devices. According to this method, however, when there are a growing number of devices, all devices operate in one channel. Thus, communication performance considerably deteriorates and channel resources may be used inefficiently.

In a second communication method, device A 110 may communicate with device B 120 and device C 130 by autonomously hopping between channel 1 and channel 2. As described above, when device A 110 communicates with device B 120 in channel 1, device A 110 may not communicate with device C 130 in channel 2. Likewise, when device A 110 communicates with device C 130 in channel 2, device A 110 may not communicate with device B 120 in channel 1. Similarly, when device B 120 and device C 130 do not communicate with device A 110, device B 120 and device C 130 may communicate with other devices through other sessions. In the second communication method, when a device has no information on channel hopping (or channel allocation) for another device to communicate with, the devices may not communicate with each other at a particular time through a particular channel. Further, if there are no defined rules and specifications for operations by switching a channel, communication performance may deteriorate.

Figure 2:
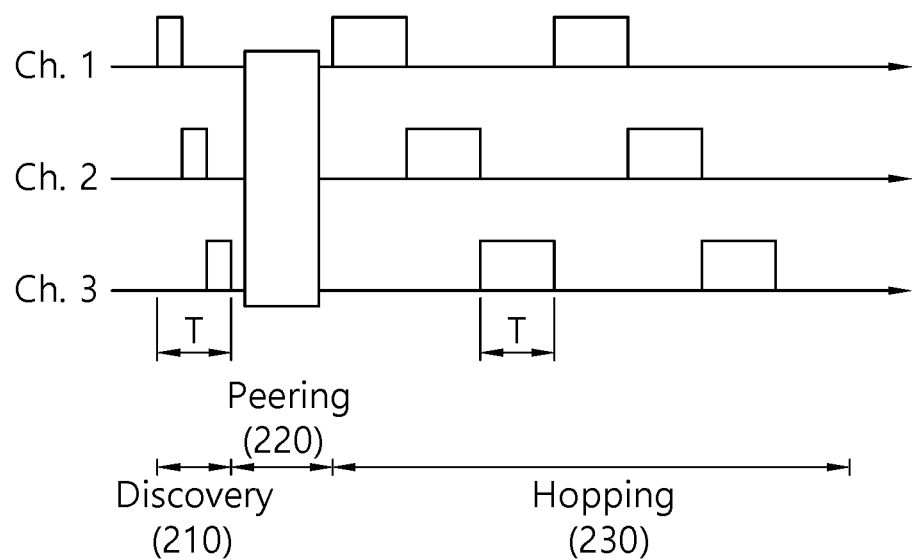
FIG. 2 is a conceptual view illustrating channel hopping in D2D communication.

FIG. 2 is a conceptual view illustrating channel hopping in D2D communication.

FIG. 2 illustrates a basic procedure for D2D communication from a device point of view. Three phases may be performed for D2D communication. The three phases for D2D communication may include a discovery phase 210, a peering phase 220, and a hopping phase 230.

In the discovery phase 210, a device may search for another device, hopping between all or part of channels for D2D communication. In the discovery phase 210, a device conducting a search may transmit a discovery request frame, hopping between channels to search for another device. The other device receiving the discovery request frame may transmit a discovery response frame to the device. The device may perform the peering phase 220 on a target device to form a session (or link) for D2D communication with among devices discovered in the discovery phase 210.

In the peering phase 220, the device may transmit a peering request frame to the target device. Further, the device may receive a peering response frame from the target device.

When a link with the target device is successfully established in the peering phase 220, the device may communicate between the target device in the hopping phase 230.

In the hopping phase 230, communication about actual traffic data may be performed between the device and the target device. The device may perform D2D communication by repeating the hopping phase 230. Further, as necessary, the device may perform the discovery phase 210 again to search for a neighbor device.

In the discovery phase 210, a time resource for discovery may be fixed to T. In the hopping phase 220, a time resource for data communication may be allocated a length which is integer times T. In the hopping phase 230, a unit of a time resource of T may be denoted by the term "slot." In the hopping phase 230, the device may use m slots as a time resource for communication.

In an embodiment of the present invention illustrated below, it is assumed for convenience that hopping is performed between a plurality of channels based on a hopping pattern (hopping sequence) defined in six slots (that is, m=6) in the hopping phase 230. The plurality of channels may be three channels. A plurality of slots in which the hopping sequence is defined may be denoted by the term "hopping slot set."

Hereinafter, in the embodiment of the present invention, a hopping sequence for channel hopping in the hopping phase 230 may be represented in brackets, such as (x, x, x, x, x, x).

In FIG. 2, the device may communicate with the other device, sequentially moving to channel 1, channel 2, channel 3, channel 1, channel 2, and channel 3 in a hopping slot set including six slots. In this case, a hopping sequence of the device may be (1, 2, 3, 1, 2, 3).

Figure 3:
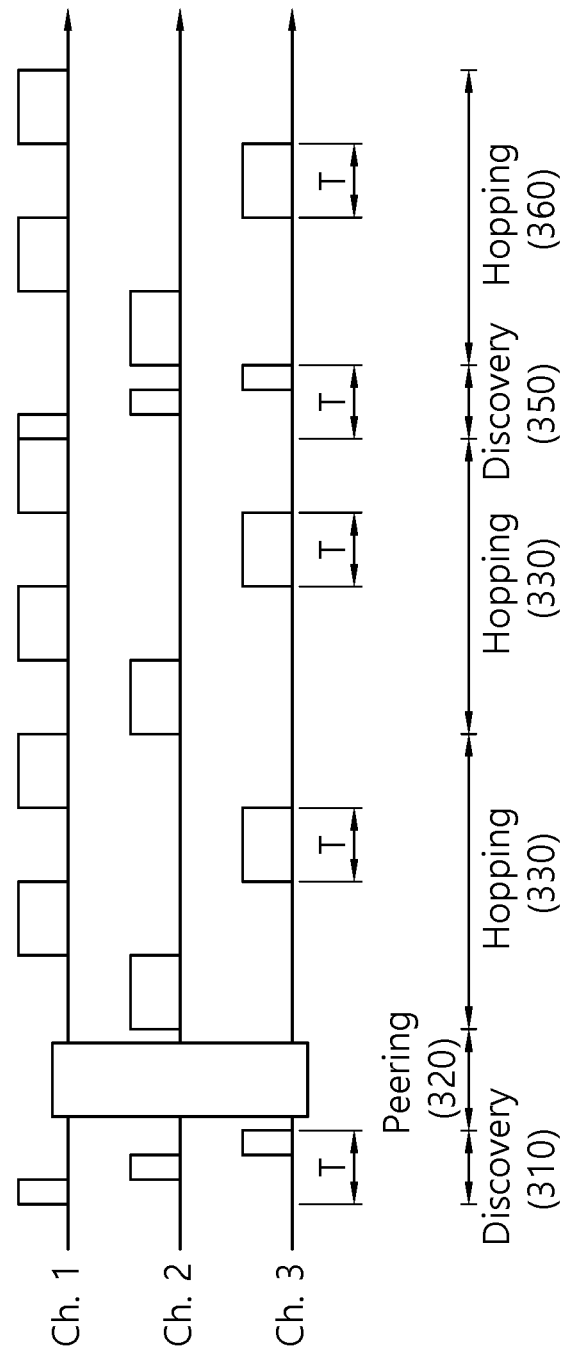
FIG. 3 is a conceptual view illustrating channel hopping in D2D communication.

FIG. 3 is a conceptual view illustrating channel hopping in D2D communication.

FIG. 3 illustrates that a device establishes a link with another device and performs D2D communication by repeating a hopping phase and a discovery phase.

Referring to FIG. 3, a device performs a first discovery phase 310 and a first peering phase 320, and then performs a first hopping phase 330. A hopping sequence may be (2, 1, 3, 1) defined in a hopping slot set including four slots. In the first hopping phase 330, D2D communication may be performed in two hopping slot sets. That is, in the first hopping phase 330, the device may perform channel hopping twice based on a hopping sequence repeated twice in eight slots.

After the first hopping phase 330, the device may perform a second discovery phase 350 and a second hopping phase 360.

Figure 4:
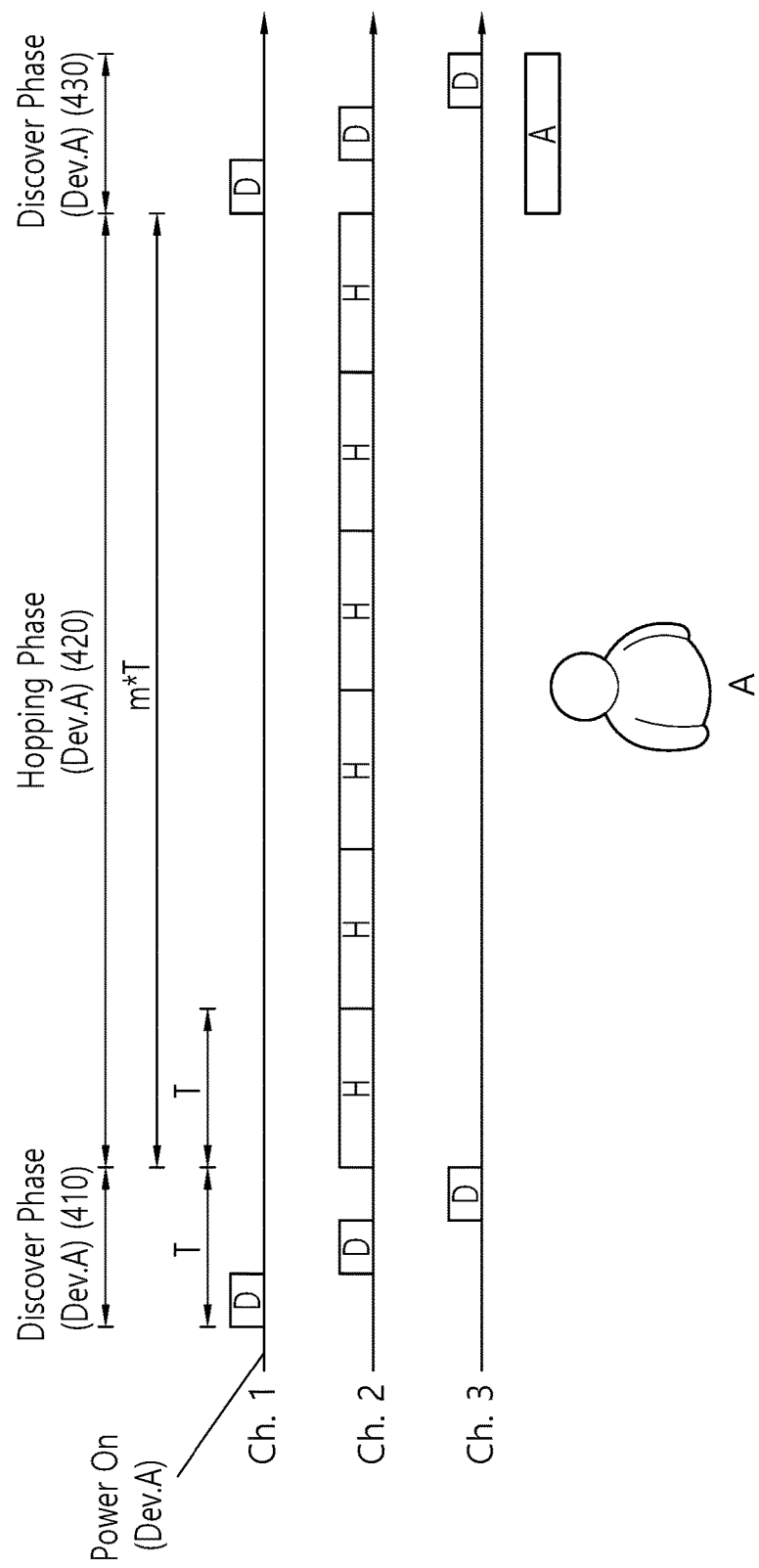
FIG. 4 is a conceptual view illustrating D2D communication.
Figure 5:
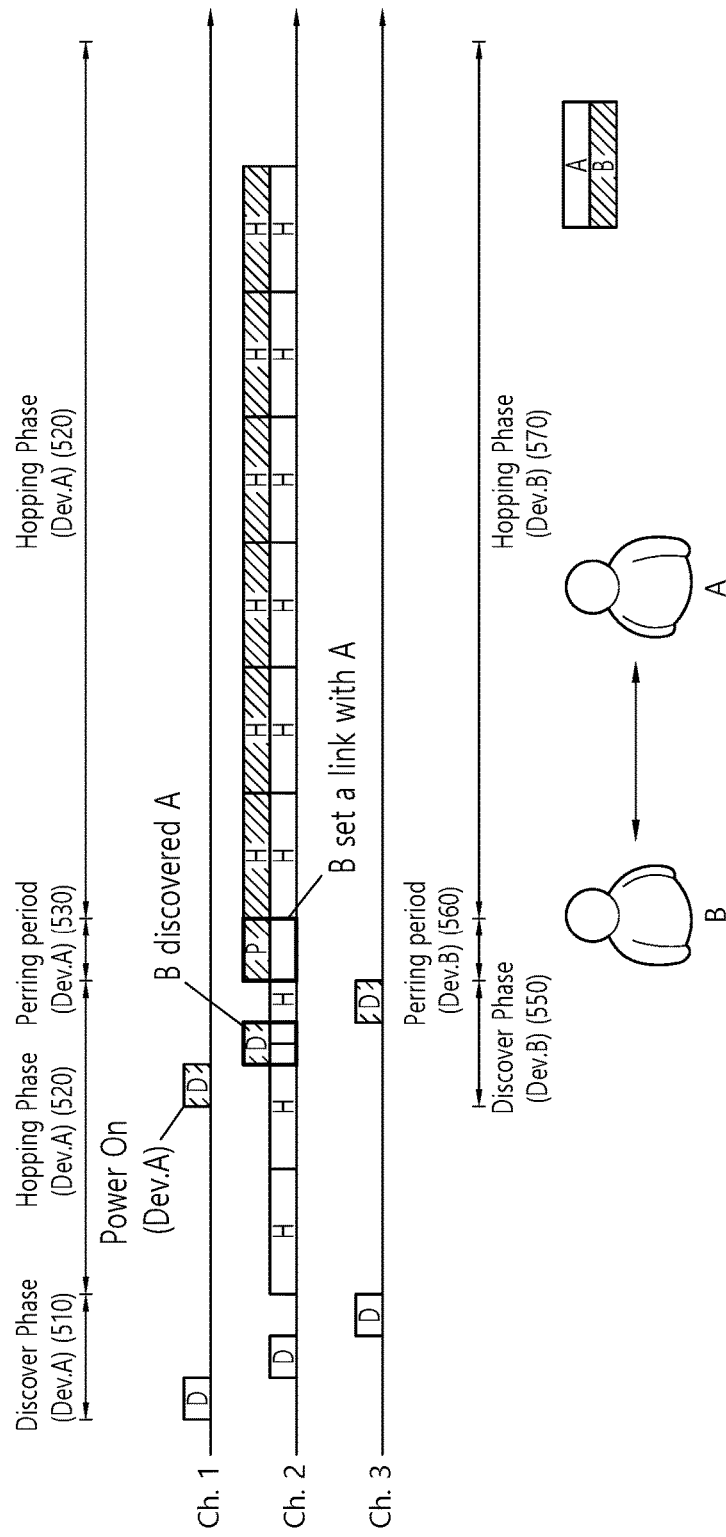
FIG. 5 is a conceptual view illustrating D2D communication.
Figure 6:
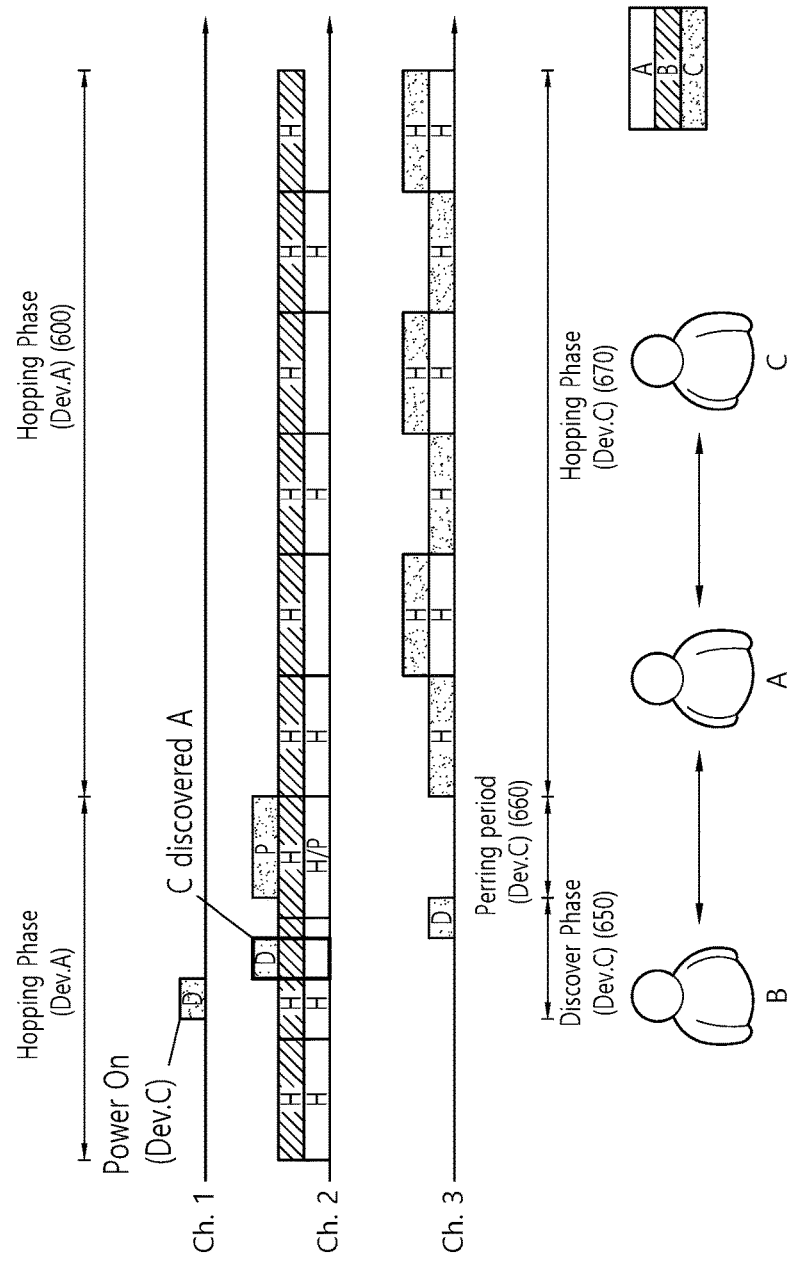
FIG. 6 is a conceptual view illustrating D2D communication.

Hereinafter, FIGS. 4 to 6 illustrate a D2D communication method through a discovery phase, a peering phase, and a hopping phase in detail.

FIG. 4 is a conceptual view illustrating D2D communication.

FIG. 4 illustrates an operation of device A in a case where device A is powered on and discovers no neighbor device. D and H may represent a discovery phase and a hopping phase, respectively.

Referring to FIG. 4, when device A is powered on, device A may search for a neighbor device, sequentially hopping between channels 1, 2, and 3, in a first discovery phase 410. In the first discovery phase 410, device A may discover no neighbor device in channels 1, 2, and 3. In this case, device A may immediately switch to a first hopping phase 420, without forming a link through a peering phase. In a case where device A continues to perform the discovery phase 410, device A needs to transmit a discovery request frame, hopping between channels, thus consuming great power. Thus, device A may switch to the hopping phase 420 to reduce power consumption even when no target device is discovered in the discovery phase 410.

In the first hopping phase 420, no link is established. Thus, device A may operate in one channel in a reception mode or low-power mode, without performing hopping, monitoring a frame of another device transmitted via the channel. When device A operates only in channel 2, a hopping sequence of the device is (2, 2, 2, 2, 2, 2). In the hopping phase 420, an operation channel for device A may be selected randomly or a channel having minimum interference may be selected.

After the first hopping phase in a hopping slot set in which a hopping sequence is defined, a second discovery phase 430 may be performed. Device A may research for a neighbor device in the second discovery phase 430.

FIG. 5 is a conceptual view illustrating D2D communication.

FIG. 5 illustrates a D2D communication operation after device B is powered on in the situation in FIG. 4. Device A may be a target device of device B. D refers to a discovery phase, H to a hopping phase, and P to a peering phase.

Device B may perform a discovery phase 550 in channels 1, 2, and 3. Device B may discover device A performing a hopping phase 520 in channel 2.

When device A is a target device of device B, device B may hop to channel 2 after the discovery phase 550 and form a link with device B through a peering phase 560.

Subsequently, device A and device B may transmit or receive traffic data in hopping phases 520 and 570. In peering phases 530 and 560 or the discovery phase 550, device A and device B may acquire information on links between counterpart devices and another device and/or information on hopping sequences of the counterpart devices.

For example, when both device A and device B have no link with another device, a link may be established between device A and device B and then communication between device A and device B may be performed in one channel (for example, channel 2). After the link is established, device A and device B may communicate by setting an operation channel to one channel 2, without hopping between channels in the hopping phases 520 and 570. Alternatively, device A and device B may perform channel hopping, in which a hopping sequence of device A and a hopping sequence of device B may be the same. Alternatively, when significant interference occurs in channel 2 used for communication, device A and device B may define a new hopping sequence to communicate based on the newly defined hopping sequence.

FIG. 6 is a conceptual view illustrating D2D communication.

FIG. 6 illustrates an operation after device C is powered on in the situation in FIG. 5. Device A may be a target device of device C.

Referring to FIG. 6, device C may search for device A in channel 2 in a discovery phase 650 through channels 1, 2, and 3.

Device C may recognize that device A and device B form a link to communicate through the discovery phase 650 and/or peering phase 660.

In this case, device A may determine a new hopping sequence to communicate with device B and device C. For example, device A may change a hopping sequence from (2, 2, 2, 2, 2, 2) to (2, 3, 2, 3, 2, 3) to operate in a hopping phase 600. That is, device A may change an operation channel on slot 2, slot 4, and slot 6 among a plurality of slots included in a hopping slot set to channel 3 for communication with device C. Device A does not change an operation channel on slot 1, slot 3, and slot 5 among the plurality of slots included in the hopping slot set, thus reducing overheads in a hopping sequence change.

The operation channel on slot 2, slot 4, and slot 6 may be selected randomly by device A or by device C. For example, device C may transmit information on a recommended channel and information on a hopping sequence for D2D communication to device A in the discovery phase 650 and/or peering phase 660. Device A may determine a hopping sequence in view of the information on the recommended channel transmitted from device C.

Device A and device C may operate by setting the same operation channel on slot 2, slot 4, and slot 6 or setting different operation channels on slot 2, slot 4, and slot 6. When an optimal channel is selected in each slot, data transmission efficiency may be enhanced, whereas overheads caused by channel hopping may occur. On the contrary, when the same channel is selected in each slot, overheads caused by channel hopping do not occur, while data transmission efficiency may be decreased.

In FIG. 6, device C may communicate with device A in slots 2, 4, and 6, operating in a hopping sequence of (3, 3, 3, 3, 3, 3) in the hopping phase 670. Device C may save slots 1, 3, and 5 for subsequent communication based on a link with another device. Device C currently has no link with another device except for device A. Thus, device C may operate by setting channel 3 as an operation channel on slots 1, 3, and 5 without channel hopping.

A hopping sequence for D2D communication between device A and device C may be determined based on various methods. Hereinafter, an embodiment of the present invention illustrates a method of determining a hopping sequence based on a delay requirement d required in a medium access control (MAC) layer of an application implemented based on D2D communication.

If various applications are operated in a physical (PHY) layer and/or MAC layer, a hopping sequence may be determined based on a delay of an application having a minimum delay requirement.

Figure 7:
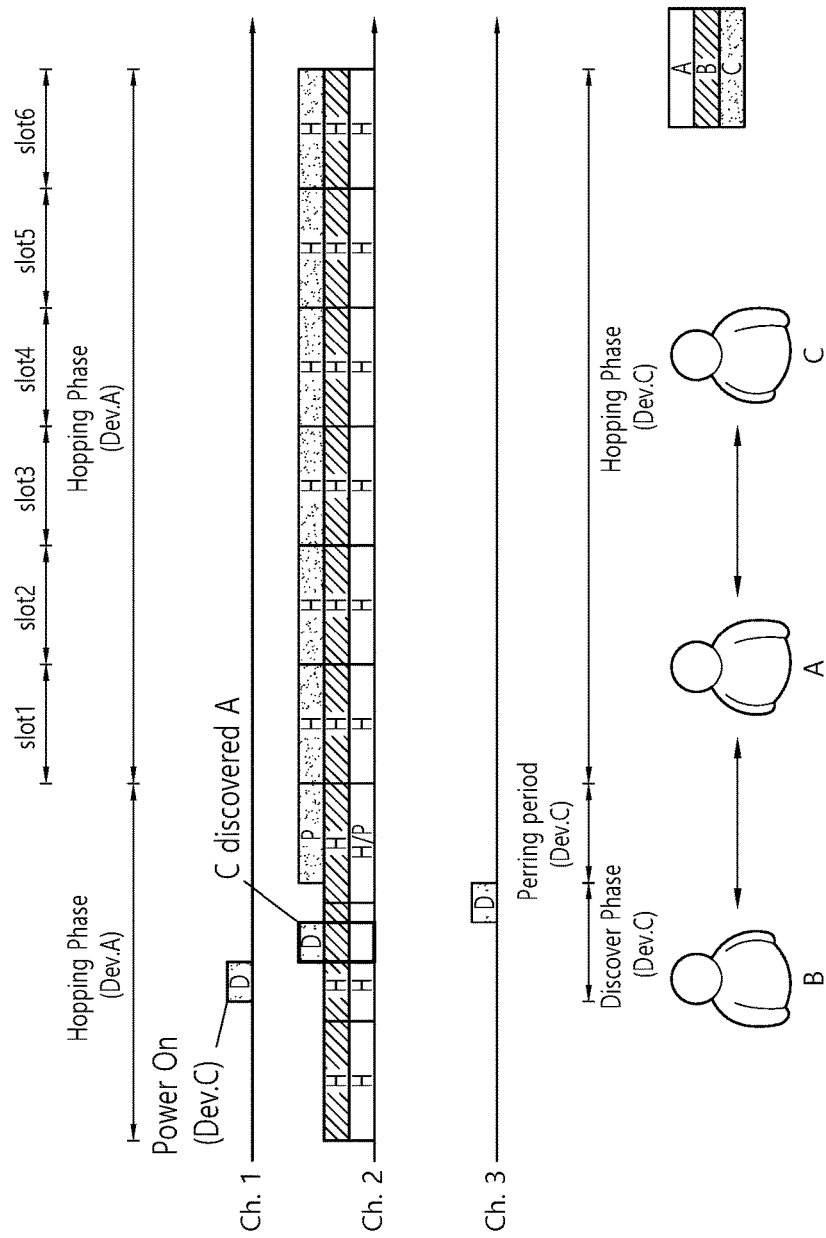
FIG. 7 is a conceptual view illustrating a hopping sequence according to an embodiment of the present invention.

FIG. 7 is a conceptual view illustrating a hopping sequence according to an embodiment of the present invention.

FIG. 7 illustrates a case where a delay requirement d between device A and device C is smaller than a slot length T and a delay requirement d between device A and device B is smaller than a slot length T.

A delay requirement may be the length of a maximum delay required in an MAC layer and/or PHY layer for an operation of an application implemented based on D2D communication. That is, D2D communication may be performed within at least the maximum delay for the operation of the application. When D2D communication between a device and another device is performed, a delay requirement may alternatively be referred to as a minimum time interval in which transmission or reception of data for D2D communication is performed between a PHY layer or MAC layer of the device and a PHY layer or MAC layer of the other device.

Referring to FIG. 7, in the case of d≤T, D2D communication needs to be performed in each slot. Thus, device A and device B need to have the same hopping sequence, and device B and device C need to have the same hopping sequence. That is, device A may communicate with both device B and device C on a time resource corresponding to one slot with a length of T through one channel. The length of one slot may be a time resource sufficient for one device to communicate with a plurality of devices through a plurality of links, respectively. One slot corresponding to T may be divided into a resource for communication between device A and device B and a resource for communication between device A and device C.

That is, device A, device B, and device C may operate based on the same hopping sequence. Device A, device B, and device C may perform D2D communication by setting one channel as an operation channel (for example, channel 2), without performing channel hopping. That is, device A, device B, and device C may have a hopping sequence of (2, 2, 2, 2, 2, 2).

Alternatively, device A, device B, and device C may have the same hopping sequence, and may communicate, hopping to the same channel on the same time resource based on the hopping sequence.

That is, in D2D communication according to the embodiment of the present invention, a device may determine a delay requirement for D2D communication with another device and determine a hopping sequence for D2D communication with the other device based on the delay requirement. The device may perform D2D communication with the other device based on the determined hopping sequence. The hopping sequence may be defined in a hopping slot set including a plurality of slots and be determined preferentially considering a previous device communicating with the device prior to the other device.

Figure 8:
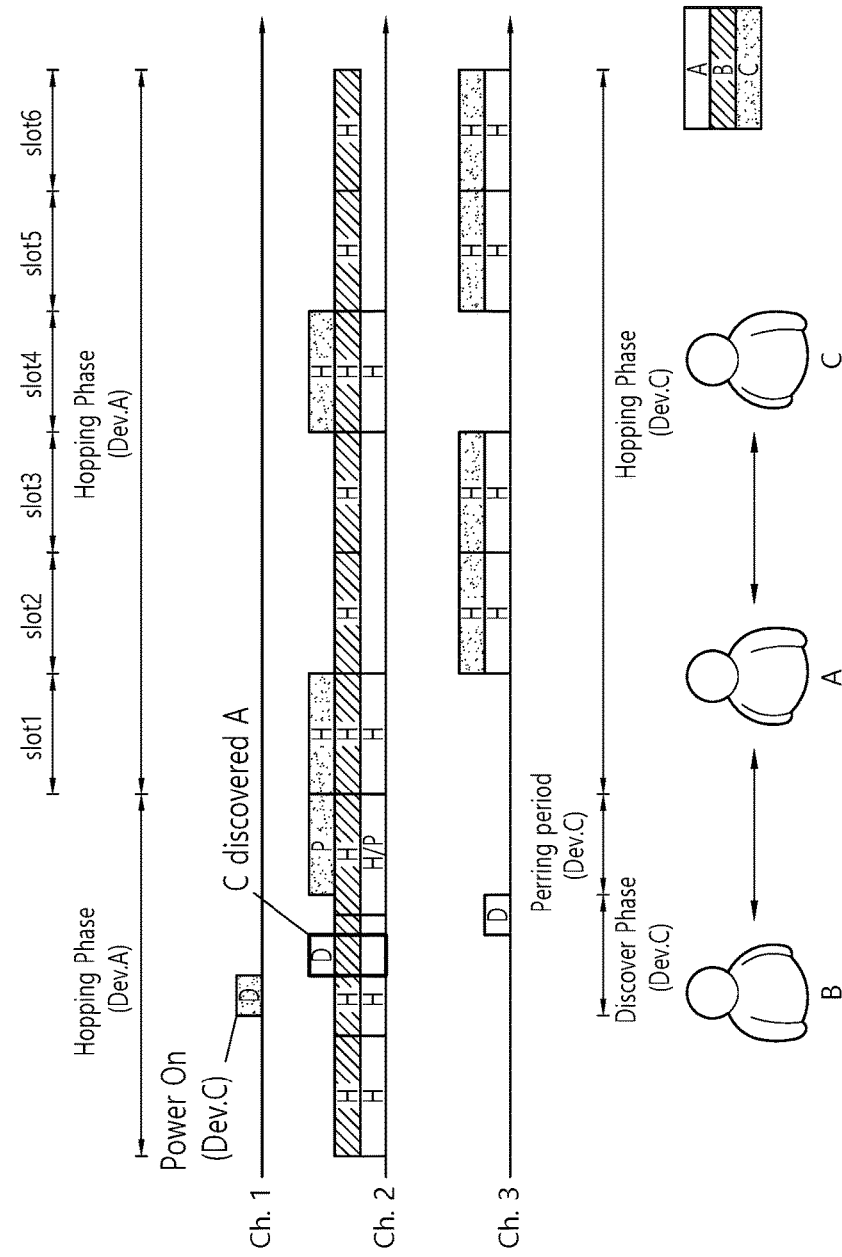
FIG. 8 is a conceptual view illustrating a hopping sequence according to an embodiment of the present invention.

FIG. 8 is a conceptual view illustrating a hopping sequence according to an embodiment of the present invention.

FIG. 8 illustrates a case where a delay requirement d is smaller than a slot length T in D2D communication between device A and device C and a delay requirement d is greater than a slot length T in D2D communication between device A and device B. That is, d≤T needs to be satisfied in D2D communication between device A and device C, and T<d needs to be satisfied in D2D communication between device A and device B.

Referring to FIG. 8, since the delay requirement for D2D communication between device A and device B is greater than T, device A and device B may not need to have the same hopping sequence. Device A may communicate with device B through channel 2 in slot 1 and slot 4 among a plurality of slots included in a hopping slot set in which a hopping sequence is defined and operate on a different channel in remaining slots (slots 2, 3, 5, and 6).

An operation channel for device A in slots 2, 3, 5, and 6 may be a different channel from channel 2. That is, device A may determine a new hopping sequence. Device A may randomly select an operation channel in slots 2, 3, 5, and 6, or determine an optimal channel through a peering phase with device C.

FIG. 8 illustrates a case where device A sets channel 3 as an operation channel in slots 2, 3, 5, and 6 in order to reduce overheads by additional channel hopping. Device A may have a hopping sequence of (2, 3, 3, 2, 3, 3).

When the delay requirement d is smaller than the slot length in D2D communication between device A and device C, device C and device A may have the same hopping sequence. Thus, device C may also have a hopping sequence of (2, 3, 3, 2, 3, 3).

Figure 9:
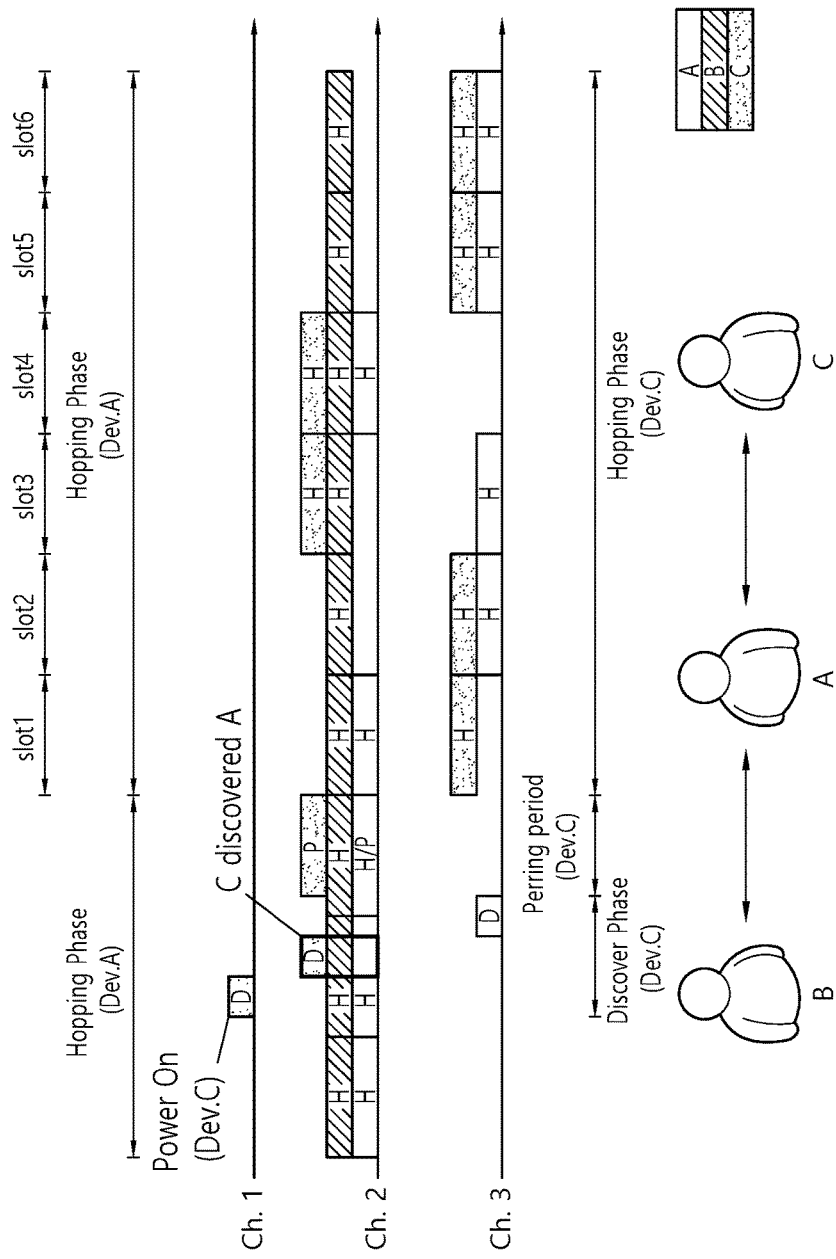
FIG. 9 is a conceptual view illustrating a hopping sequence according to an embodiment of the present invention.

FIG. 9 is a conceptual view illustrating a hopping sequence according to an embodiment of the present invention.

FIG. 9 illustrates a case where a delay requirement d is greater than a slot length T and is equal to or smaller than 2T in D2D communication between device A and device C, and a delay requirement d is greater than 2T in D2D communication between device A and device B. That is, T<d≤2T needs to be satisfied in D2D communication between device A and device C, and 2T<d needs to be satisfied in D2D communication between device A and device B. In the case of T<d≤2T, since the delay requirement is greater than T, no transmission may be performed in one slot. However, since the delay requirement is equal to or smaller than 2T, if no transmission is performed in two consecutive slots, the delay requirement for D2D communication may not be satisfied.

Referring to FIG. 9, D2D communication between device A and device C may be performed in slots 1, 3, and 5 or slots 2, 4, and 6. If the length of a slot unit in which a hopping sequence is defined is not 6T, D2D communication between device A and device C may be performed in odd-numbered slots or even-numbered slots.

Since the delay requirement for D2D communication with device B and the delay requirement for D2D communication with device C are different, device A may determine a hopping sequence preferentially considering the requirement with device B establishing a link with device A first. Device A may allocate slots 1 and 4 in the slot unit for D2D communication with device B. That is, device A may set channel 2 as an operation channel in slots 1 and 4 to operate. Also, device A may allocate slots 2, 4, and 6 for D2D communication with device C. Device A may operate in channel 3 in slots 2, 3, 5, and 6.

That is, device A may operate by setting channel 2 as an operation channel in slots 1 and 4, and channel 3 as an operation channel in slots 2, 3, 5, and 6. That is, device A may operate by setting a hopping sequence of (2, 3, 3, 2, 3, 3).

Device C communicates with device A in slots 2, 4, and 6 and thus may set the same channels as for device A in slots 2, 4, and 6. That is, elements of a hopping sequence of device C in slots 2, 4, and 6 may be the same as elements of a hopping sequence of device A in slots 2, 4, and 6. The hopping sequence may be represented by (x, 3, x, 2, x, 3). Here, x is an undecided channel.

Device C has no link with another device except for device A and thus may determine respective channels in remaining slots 1, 3, and 5 to be the same as channels corresponding to subsequent slots in order to reduce overheads by channel hopping. That is, the hopping sequence of device C may be (3, 3, 2, 2, 3, 3). Channels corresponding to slots 1, 3, and 5 may be determined randomly.

FIG. 6 may correspond to a case where a delay requirement d between device A and device C is greater than a slot length T and is equal to or smaller than 2T, and a delay requirement d between device A and device B is greater than a slot length T and is equal to or smaller than 2T.

Referring to FIG. 6, D2D communication between device A and device B may be performed in slots 1, 3, and 5, and D2D communication between device A and device C may be performed in slots 2, 4, and 6.

Specifically, device A may determine a hopping sequence preferentially considering the requirement with device B establishing a link with device A first. Device A may allocate slots 1, 3, and 5 in the slot unit for D2D communication with device B. That is, device A may operate by setting channel 2 as an operation channel in slots 1, 3, and 5. Further, device A may allocate slots 2, 4, and 6 for communication with device C. Device A may operate in channel 3 in slots 2, 4, and 6. That is, device A may have a hopping sequence of (2, 3, 2, 3, 2, 3), device B may have a hopping sequence of (2, 2, 2, 2, 2, 2), and device C may have a hopping sequence of (3, 3, 3, 3, 3, 3).

Figure 10:
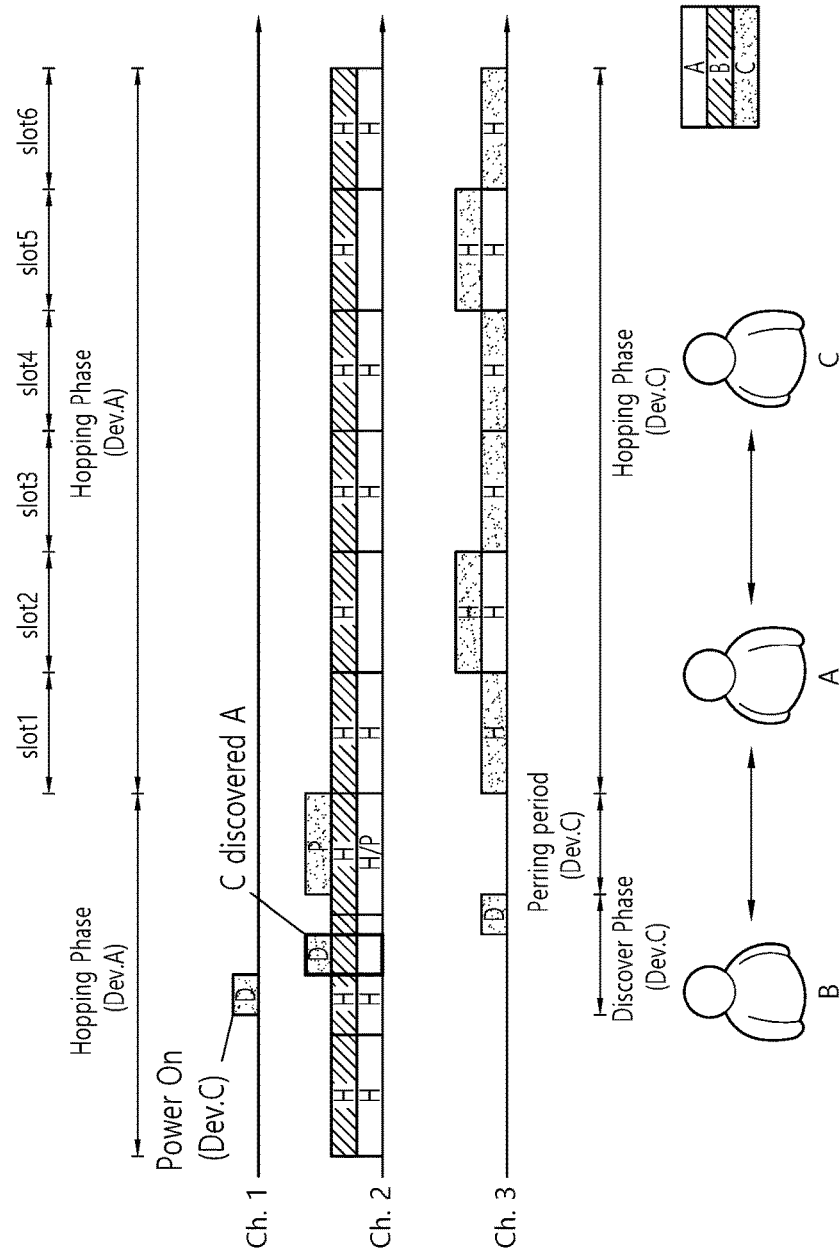
FIG. 10 is a conceptual view illustrating a hopping sequence according to an embodiment of the present invention.

FIG. 10 is a conceptual view illustrating a hopping sequence according to an embodiment of the present invention.

FIG. 10 illustrates a case where a delay requirement d for D2D communication between device A and device C is greater than a double slot length 2T and is smaller than (m−1) times the slot length (m−1)T ( 2T<d≤(m−1)T). As described above, m may be the number of slots included in a hopping slot set in which a hopping sequence is defined. Further, FIG. 10 illustrates a case where a delay requirement d for D2D communication between device A and device B is greater than T. If m is 6, the delay requirement is longer than 2T, and thus two consecutive slots may not be used for communication. However, since the delay requirement is smaller than 5T, D2D communication is performed through at least two slots in one slot unit.

Referring to FIG. 10, for example, device A may allocate slots (1, 4), (2, 5), or (3, 6) for communication with device C. If the length of the slot unit is not 6T, one slot group among slots having a remainder of 0 obtained by dividing the length of a slot unit by 3 (slots 3,6,9, . . . ), slots having a remainder of 1 (slots 1,4,7, . . . ), and slots having a remainder of 2 (slots 2,5,8, . . . ) may be allocated to the device. For convenience of implementation and a uniform delay in packet transmission, as described above, slots 1 and 4, slots 2 and 5, or slots 3 and 6 may be allocated always in bundles as one slot set unit.

FIG. 10 illustrates that device A allocates slots 2 and 5 for communication with device C.

Figure 11:
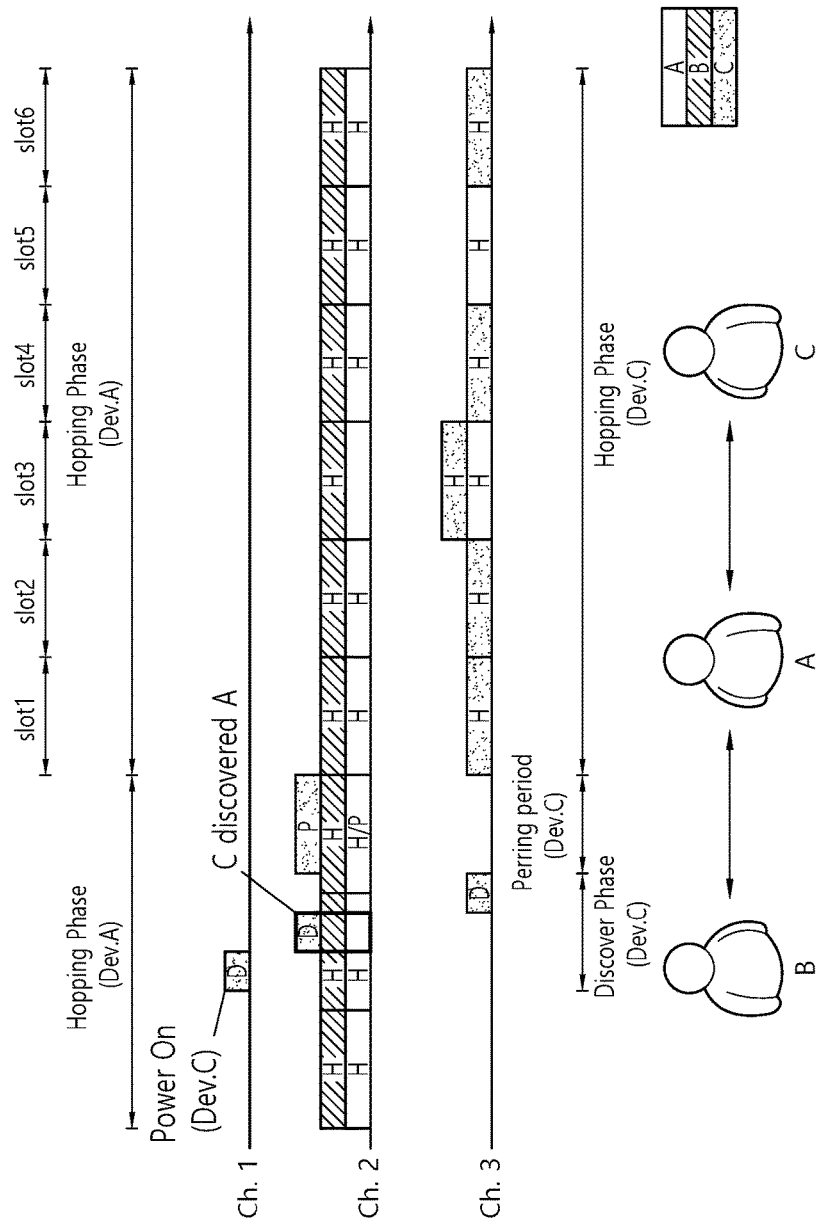
FIG. 11 is a conceptual view illustrating a hopping sequence according to an embodiment of the present invention.

FIG. 11 is a conceptual view illustrating a hopping sequence according to an embodiment of the present invention.

FIG. 11 illustrates a case where a delay requirement d for D2D communication between device A and device C is greater than (m−1) times a slot length (m−1)T((m−1)T<d). Further, FIG. 11 illustrates a case where a delay requirement d for D2D communication between device A and device B is greater than T.

Referring to FIG. 11, when the delay requirement is greater than (m−1)T, only one slot in a slot unit may be allocated for D2D communication. Device A may allocate one slot, slot 3, in one slot unit for D2D communication with device C.

Figure 12:
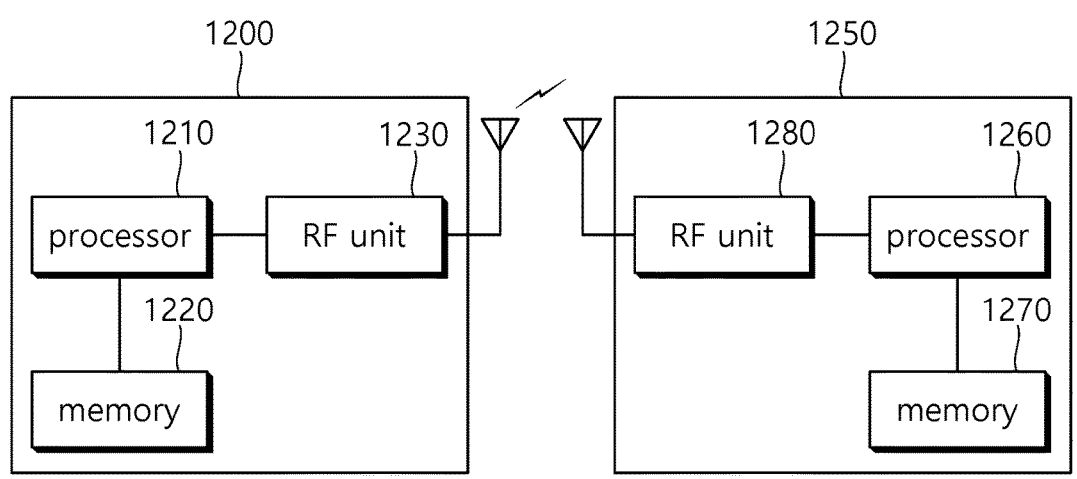
FIG. 12 is a block diagram illustrating a wireless device according to an embodiment of the present invention.

FIG. 12 is a block diagram illustrating a wireless device according to an embodiment of the present invention.

Referring to FIG. 12, a first device 1200 and a second device 1250 may be wireless devices capable of implementing the foregoing embodiments.

The first device 1200 includes a processor 1210, a memory 1220, and a radio frequency (RF) unit 1230.

The RF unit 1230 may be connected to the processor 1210 to transmit/receive a radio signal.

The processor 1210 may implement functions, processes and/or methods suggested in the present invention. For example, the processor 1210 may perform the operations of the devices according to the embodiments of the present invention illustrated in FIGS. 7 to 11.

For example, the processor 1210 may be configured to determine a delay requirement for first link-based first D2D communication with the second device, to determine a hopping sequence for first D2D communication based on the delay requirement, and to perform first D2D communication with the second device based on the hopping sequence. The delay requirement may be a minimum time interval in which transmission or reception of data for first D2D communication is performed between a PHY layer or MAC layer of the first device and a PHY layer or MAC layer of the second device.

The second device 1250 includes a processor 1260, a memory 1270, and an RF unit 1280.

The RF unit 1280 may be connected to the processor 1260 to transmit/receive a radio signal.

The processor 1260 may implement functions, processes and/or methods suggested in the present invention. For example, the processor 1260 may perform the operations of the devices according to the embodiments of the present invention illustrated in FIGS. 7 to 11.

For example, the processor 1260 may be configured to determine a delay requirement for first link-based first D2D communication with the first device, to determine a hopping sequence for first D2D communication based on the delay requirement, and to perform first D2D communication with the first device based on the hopping sequence.

The processors 1210 and 1260 may include an application-specific integrated circuit (ASIC), a separate chipset, a logic circuit, a data processor, and/or a converter to convert a baseband signal and a radio signal from one to the other. The memories 1220 and 1270 may include a read-only memory (ROM), a random access memory (RAM), a flash memory, a memory card, a storage medium, and/or other equivalent storage devices. The RF units 1230 and 1280 may include at least one antenna to transmit and/or receive a radio signal.

When the embodiments are implemented with software, the foregoing techniques may be implemented by a module (process, function, or the like) for performing the foregoing functions. The module may be stored in the memories 1220 and 1270 and be executed by the processors 1210 and 1260. The memories 1220 and 1270 may be disposed inside or outside the processors 1210 and 1260 or be connected to the processors 1210 and 1260 via various well-known means.

What is claimed is:

1. A device-to-device (D2D) communication method based on channel hopping, the method comprising:
   determining, by a first device that operates in accordance with a hopping sequence determined for first link-based D2D communication with a second device on a plurality of time slots, a delay requirement for second link-based D2D communication with a third device, wherein the delay requirement corresponds to a first time length of a delay, and wherein the delay requirement is require between a physical (PHY) layer and a medium access control (MAC) layer of the first device and a PHY layer and a MAC layer of the third device;
   updating, by the first device, the hopping sequence on the basis of the delay requirement, wherein the first link-based D2D communication is given more weight than the second link-based D2D communication in at least one aspect when the hopping sequence is updated; and
   performing, by the first device based on the updated hopping sequence, the first link-based D2D communication with the second device and the second link-based D2D communication with the third device.

2. The method of claim 1, wherein:
   the plurality of time slots correspond to m slot units, wherein m is an integer greater than or equal to 2,
   each of the m slot units is set to have a preset second time length, and
   the m slot units are sequentially set to have slot indices of 0 to m−1.

3. The method of claim 2, wherein:
   when the first time length is less than or equal to the second time length, the updated hopping sequence is the same as the hopping sequence for the first link-based D2D communication.

4. The method of claim 2, wherein:
   when the first time length is greater than the second time length but less than or equal to two times the second time length, the updated hopping sequence is set to perform the second link-based D2D communication with the third device on at least one slot unit of an odd slot index or at least one slot unit of an even slot index among the m slot units.

5. The method of claim 2, wherein:
   when the first time length is greater than two times the second time length but less than or equal to (m−1) times the second time length, the updated hopping sequence is set to perform the second link-based D2D communication with the third device on at least one slot unit corresponding to at least one value obtained by performing a modular 3 operation on each of the slot indices of 0 to m−1.

6. The method of claim 2, wherein:
   when the first time length is greater than (m−1) times the second time length, the updated hopping sequence is set to perform the second link-based D2D communication with the third device on any one of the m slot units.

7. A first device that performs a device-to-device (D2D) communication method based on channel hopping and operates in accordance with a hopping sequence determined for first link-based D2D communication with a second device on a plurality of time slots, the first device comprising:
   a radio frequency (RF) unit configured to transmit or receive a radio signal; and
   a processor operatively connected to the RF unit,
   wherein the processor is configured to:
   determine a delay requirement for second link-based D2D communication with a third device, wherein the delay requirement corresponds to a first time length of a delay, and wherein the delay requirement is required between a physical (PHY) layer and a medium access control (MAC) layer of the first device and a PHY layer and a MAC layer of the third device,
   update the hopping sequence on the basis of the delay requirement, wherein the first link-based D2D communication is given more weight than the second link-based D2D communication in at least one aspect when the hopping sequence is updated, and
   perform, based on the updated hopping sequence and using the RF unit, the first link-based D2D communication with the second device and the second link-based D2D communication with the third device.

8. The first device of claim 7, wherein:
   the plurality of time slots correspond to m slot units, where m is an integer greater than or equal to 2,
   each of the m slot units is set to have a preset second time length, and
   the m slot units are sequentially set to have slot indices of 0 m−1.

9. The method of claim 8, wherein when the first time length is less than or the second time length, the updated hopping sequence is the same as the hopping sequence for the first link-based D2D communication.

10. The first device of claim 8, wherein when the first time length is greater than the second time length but less than or equal to two times the second time length, the updated hopping sequence is set to perform the second link-based D2D communication with the third device on at least one slot unit of an odd slot index or at least one slot unit of an even slot index among the m slot units.

11. The first device of claim 8, wherein when the first time length is greater than two times the second time length but less than or equal to (m−1) times the second time length, the updated hopping sequence is set to perform the second link-based D2D communication with the third device on at least one slot unit corresponding to at least one value obtained by performing a modular 3 operation on each of the slot indices of 0 to m−1.

12. The first device of claim 8, wherein when the first time length is greater than (m−1) times the second time length, the updated hopping sequence is set to perform the second link-based D2D communication with the third device on any one of the m slot units.

* * * * *